No. 612,659. Patented Oct. 18, 1898.
A. W. BROWNE.
FOUNTAIN SPITTOON.
(Application filed Aug. 19, 1897.)
(No Model.) 3 Sheets—Sheet 1.
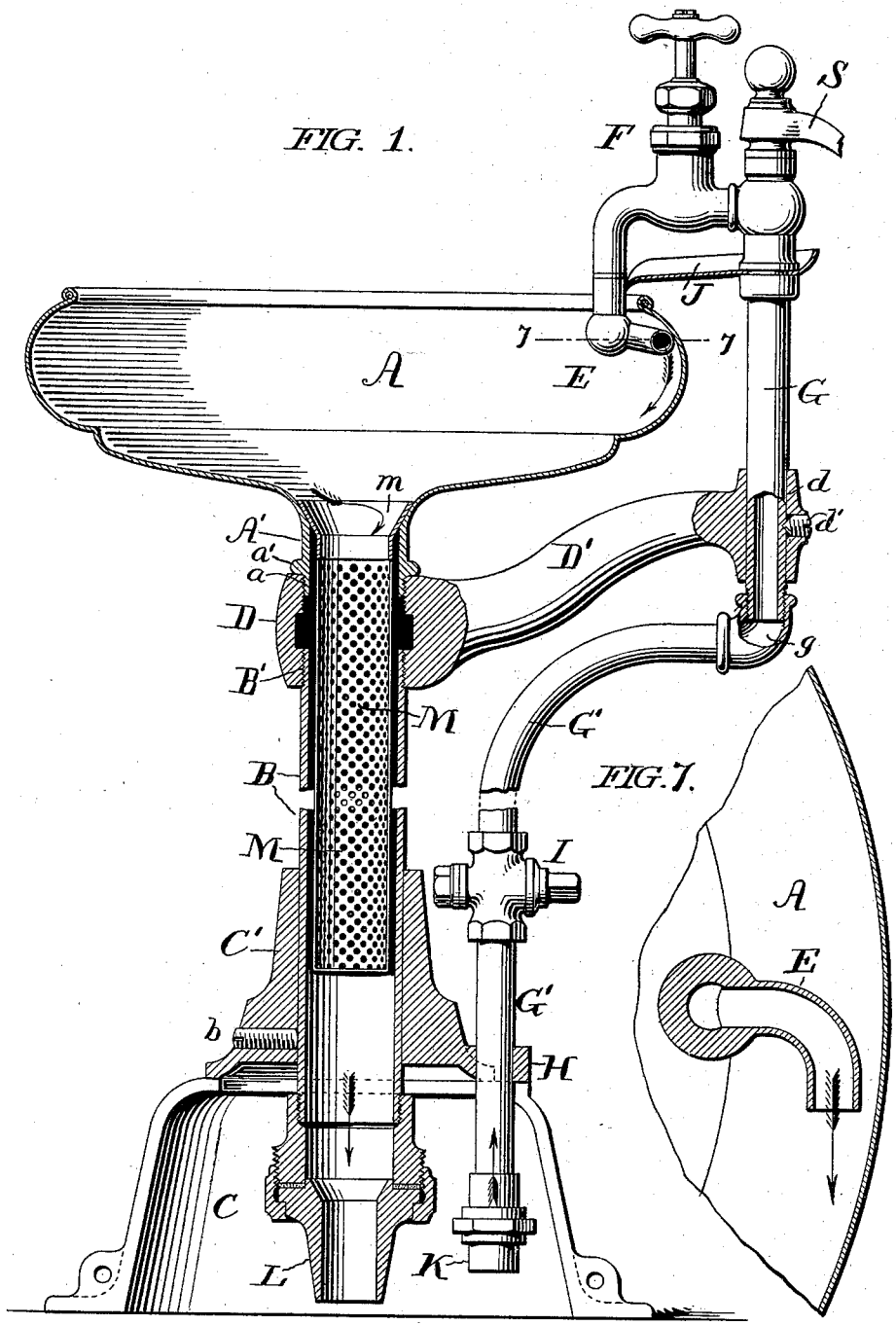

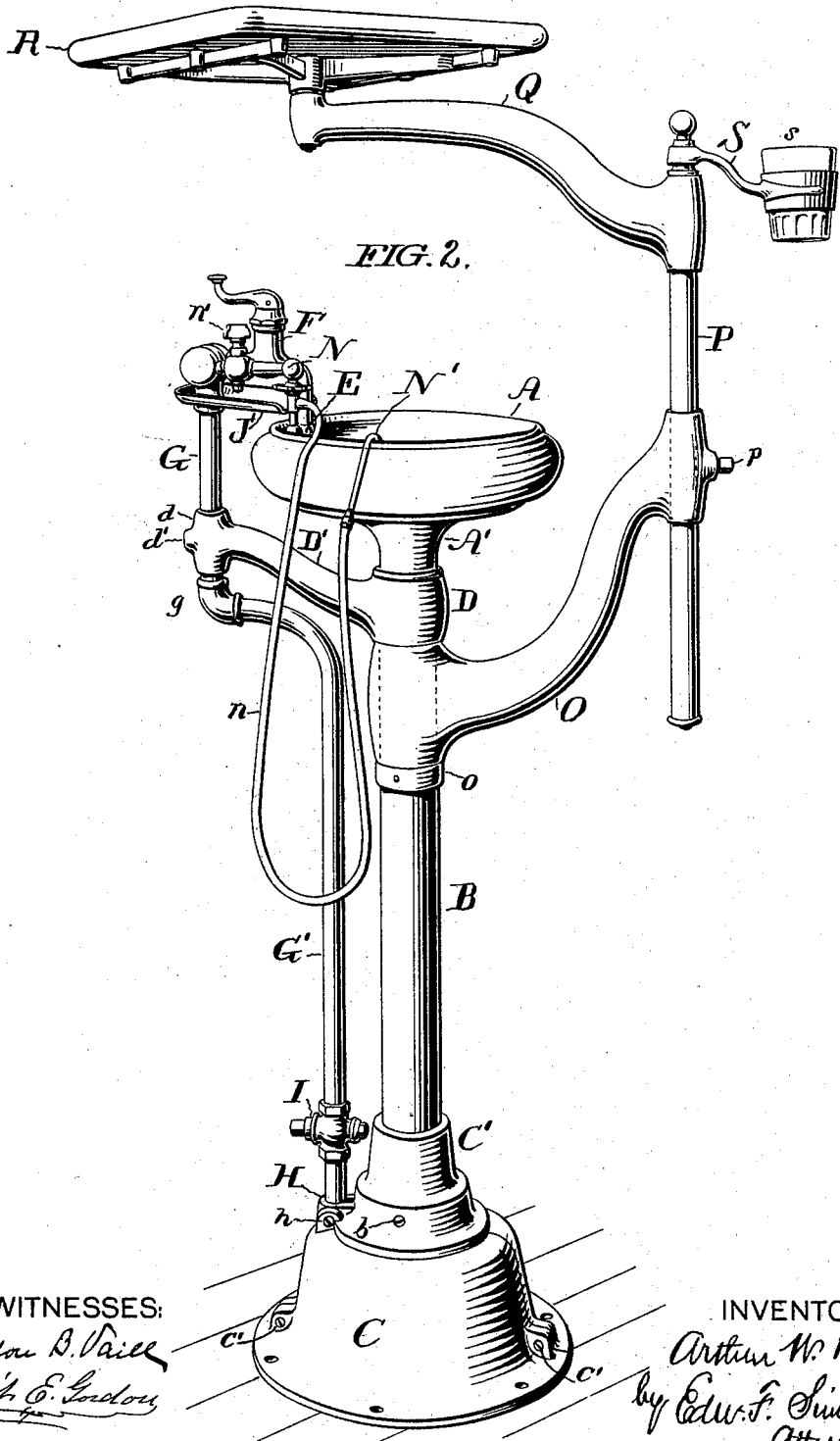

No. 612,659. Patented Oct. 18, 1898.
A. W. BROWNE.
FOUNTAIN SPITTOON.
(Application filed Aug. 19, 1897.)
(No Model.) 3 Sheets—Sheet 3.
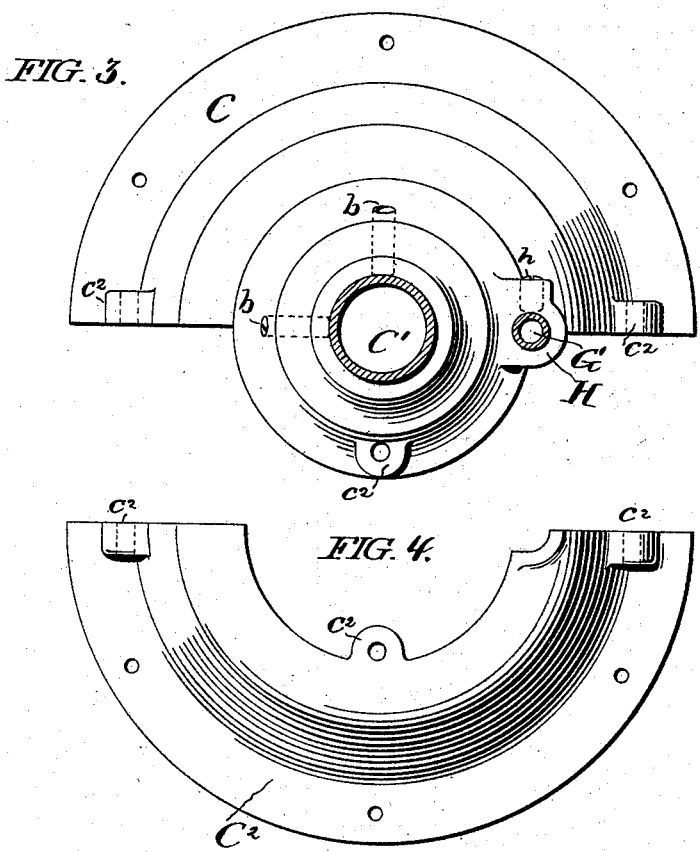
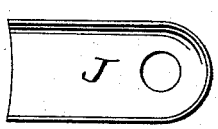
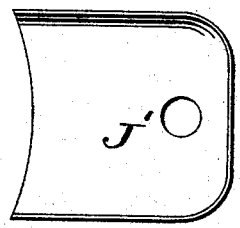
WITNESSES:
INVENTOR:
Arthur W. Browne,
by Edw. F. Simpson, Jr.
Attorney.

UNITED STATES PATENT OFFICE.

ARTHUR W. BROWNE, OF NEW YORK, N. Y., ASSIGNOR TO THE S. S. WHITE DENTAL MANUFACTURING COMPANY, OF PHILADELPHIA, PENNSYLVANIA.

FOUNTAIN-SPITTOON.

SPECIFICATION forming part of Letters Patent No. 612,659, dated October 18, 1898.

Application filed August 19, 1897. Serial No. 648,746. (No model.)

*To all whom it may concern:*

Be it known that I, ARTHUR W. BROWNE, a citizen of the United States, residing at New York, (Prince's Bay,) in the county of Richmond and State of New York, have invented certain new and useful Improvements in Fountain-Spittoons; and I do hereby declare the following to be a full, clear, and exact description of the invention, such as will enable others skilled in the art to which it appertains to make and use the same.

My invention relates to improvements, as hereinafter claimed, in fountain-spittoons for the use of dentists and others; and my object is to provide a spittoon that is simple in construction, durable, and that can readily be taken apart for cleansing and transportation.

In the accompanying drawings, Figure 1 is a view, partly in side elevation and partly in vertical central section, of a fountain-spittoon embodying one form of my invention, the upright standard being shown as broken away and shortened. Fig. 2 is a perspective view, on a smaller scale than that of Fig. 1, of a fountain-spittoon of slightly-modified construction. Figs. 3 and 4 are plan views, on the same scale as that on Fig. 1, of the respective sections of the base. Fig. 5 is a plan view of a drip-tray used in connection with the spittoon shown in Fig. 1, while Fig. 6 is a similar view of the drip-tray used in connection with the spittoon shown in Fig. 2. Fig. 7 is a horizontal sectional view, on the line 7 7 of Fig. 1, of a portion of the spittoon-bowl, showing the water-sprayer or nozzle on a scale larger than that of Fig. 2.

The respective spittoons shown in Figs. 1 and 2 are generally similar and differ only in respect to certain features hereinafter more fully explained, the parts otherwise corresponding in the two apparatus. I will therefore first proceed to describe the apparatus illustrated in Fig. 1, referring to Fig. 2 for its general outward appearance, and will then point out the additions or modifications shown in Fig. 2.

The bowl A of the spittoon, which may be of any suitable or well-known size and shape, is preferably made of metal—such as spun brass, for example—and is detachably connected to the upper end of a tubular support, which is shown as consisting of an upright standard B. In this instance I have shown the bowl as being connected to the upright standard by way of the inner perforated end or hub D of a bracket-arm D', to be farther on explained. The opening in the bracket-arm hub D is threaded and at its lower end screws upon the exteriorly-threaded portion B' of the standard B, while the exteriorly-threaded portion $a$ of the neck A' of the bowl screws into the upper end of the threaded opening of the bracket-arm. An annular flange $a'$ on the exterior of the neck of the bowl serves to limit the extent to which the neck can be screwed into the bracket-arm and insures a tight connection between the parts. The standard B also serves as the waste or discharge pipe for the spittoon-bowl and is adapted to be detachably mounted and supported upon a base C of dome-like form, the standard snugly fitting in the tubular socket portion C' of the base and firmly locked therein by set-screws $b\ b$, which pass through the tubular socket portion of the base and bear upon the standard.

The base consists of two separable sections C and $C^2$, provided with the perforated flanged or disk portion $c$, which rests upon the floor, and with the tubular socket portion C', forming part of the section C. The two sections of the base are detachably connected by means of screws or bolts $c'$, (see Fig. 2,) passing through perforated lugs $c^2$ on the respective sections.

The spittoon-bowl is supplied with water by means of a nozzle or sprayer E, (see Figs. 1 and 7,) connected with a suitable cock F. The nozzle or sprayer is preferably curved and occupies substantially a horizontal position, although slightly pointed downward at its outer end. This arrangement is such that a spray of water is forced against the side of the bowl in such a way as to cause the water to flow around the inner surface of the bowl, which is thereby thoroughly flushed and cleansed. It will be seen that the jet or spray of water strikes the side of the bowl tangentially or at an extreme obtuse angle. The cock F is mounted upon a supporting-tube G, which has detachable supporting connection with the outer end of the bracket-arm D', before referred to, the supporting-tube G fitting in a socket $d$ of said arm D' and locked therein by a set-screw $d'$. Thus the water-sprayer, it will be seen, overhangs the bowl. The lower end of the supporting-tube extends a short distance below the bracket-arm and is externally threaded to adapt it to be detachably connected with the upper end of a supply-pipe G', the connection being shown as made by an elbow-joint $g$. The lower end of the supply-pipe passes through a perforated lug H on the section C of the base and is clamped therein by a set-screw $h$. (See Figs. 2 and 3.) The supply-pipe for the greater portion of its length lies parallel with the standard B and is curved at top to approximately correspond with the curvature of the bracket-arm D', so as to make proper connection with the water-sprayer-supporting tube G. At a point preferably just above the base the supply-pipe is provided with a cock I for regulating the amount of water to be supplied to the spittoon-bowl by way of the sprayer or nozzle E, the cock F being used to open and shut off the supply of water. A drip-pan J, of trough-like shape, is suitably supported upon the supporting-tube G, between the cock F and the sprayer E, so as to catch any water that may drip from the cock and convey it to the bowl, the inner edge of the pan extending over the edge of the bowl.
The pan is provided with an upturned flange on all sides except the inner or outlet end, which is preferably curved downwardly.

Both the supply and discharge pipes are provided at their lower ends, inside the base, with suitable couplings K and L, of any well-known construction, for making proper connection with the service and waste pipes, which, although not shown in the drawings, project through the floor, as will readily be understood. These connections are readily accessible by removing the detachable section $C^2$ of the base without disturbing the remaining portions of the spittoon.

In order to prevent solid material—such as cotton, &c.—from passing into the waste-pipe, I have provided a strainer M, consisting of a cylinder having perforated sides and bottom and an open top. The strainer is adapted to fit in the discharge-pipe and is of sufficiently smaller diameter than the interior of said pipe as to allow water to pass through the perforations in the side of the strainer and down through the space between the strainer and the discharge-pipe. The upper end of the cylinder is provided with a flange $m$, which rests upon the upper portion of the neck of the bowl in order to retain the strainer in position. By this construction the strainer may be readily removed for cleaning, &c.
In the modification shown in Fig. 2 there is provided, in addition to the water-sprayer E and faucet F, an attachment N for a saliva-ejector N', of any well-known construction, which is connected to the attachment by way of a flexible tube $n$. The saliva-ejector attachment, which need not be described in detail and which is provided with a stop-cock $n'$, is mounted upon the supply-pipe adjacent to or by the side of the faucet F. It will be observed that the faucet in this modification is a spring or self-closing faucet, whereas the one shown in Fig. 1 is a screw-faucet. The style of faucet forms no part of my invention, as any desired suitable form may be employed. A drip-pan J', similar to that previously described, but somewhat larger, is provided for conveying all drippings from the faucet and saliva-ejector attachment to the spittoon-bowl. For a plan view of this drip-pan see Fig. 6.

A bracket O has swiveling supporting connection with the upright standard of the spittoon by way of an opening in its inner end, which surrounds the standard below the bracket-arm D' and is held in position by a collar $o$, fixed upon the standard. The outer end of the bracket is socketed to receive a rod P, which is vertically adjustable therein and which may be locked in any desired position to which it may be adjusted by means of a set-screw $p$. At or near the upper end of the rod P there is mounted so as to swivel thereon an arm Q, upon the outer end of which is mounted a tool bracket or table R. If desired, a glass-holder S for supporting a glass $s$ may be secured to the upper end of the rod P, about which it may be turned. A portion of a similar glass-holder S is also shown in Fig. 1.

Obviously other modifications may be made, if desired, without departing from the spirit of my invention. For instance, the tubular standard may project above the bracket-arm and the spittoon-bowl be attached directly to said standard, and other means may be employed in place of the threaded connections at the various joints of the apparatus, although the threaded connections are preferred. The detachable spittoon-bowl may, if desired, be used in connection with fountain-spittoons differing in construction from the type of spittoon herein shown and having different forms of supports instead of the tubular standard—such, for instance, as supports adapted to be attached to dental chairs.

The operation of the apparatus is as follows: Suitable connection being made between the supply and discharge pipes and the service and waste pipes, respectively, and the amount of water regulated by the cock I, the bowl may be supplied with water by turning on the faucet F. The water after circulating around the bowl and flushing the same passes through the discharge-pipe B and off by way of the waste-pipe. (Not shown.)

From the above description it will be seen that, the bowl being detachably secured to the standard or discharge pipe and the faucet and water-sprayer being supported wholly independent of the bowl, the bowl may be readily detached from the standard for the purpose of making repairs or substituting a new bowl without in any way disturbing the sprayer or other parts of the apparatus, and that the various parts of the apparatus may be readily separated for making repairs and for convenient packing for transportation— that is to say, the standard or discharge-pipe may be quickly detached from the base, the bracket-arm detached from the standard, and the sprayer, faucet, and upper section of the supply-pipe separated from the bracket-arm and the lower section of the supply-pipe, which may likewise be separated from the base.

I claim as my invention—

1. The combination, in a fountain-spittoon, of the tubular support, the spittoon-bowl having detachable supporting connection with the top of said support, the water-sprayer overhanging said bowl for supplying the same with water and having supporting connection with said support at a point below and outside of the spittoon-bowl and independent of said bowl, whereby the spittoon-bowl may be detached from the upright support without disturbing the water-sprayer, substantially as set forth.

2. The combination, in a fountain-spittoon, of the spittoon-bowl, the tubular support for supporting said bowl and by way of which the bowl may be discharged of water, the bracket-arm projecting from said support and provided with a socket at its outer end, the water-sprayer-supporting tube having detachable supporting connection with the socketed bracket-arm, the supply-pipe having detachable connection with said supporting-tube, and the water-sprayer mounted upon said supporting-tube, substantially as and for the purpose set forth.

3. The combination, in a fountain-spittoon, of the hollow base of dome-like form provided with two sockets, and having a detachable section, the discharge-pipe and the supply-pipe supported side by side in the said sockets of the base, and extending downwardly inside thereof, couplings upon the lower ends of the discharge and supply pipes inside the base for making connections with the waste and service pipes, respectively, which are adapted to project above the floor on which the base rests, whereby when the detachable section of the base is removed ready access may be had to the couplings between the discharge and waste pipes and the supply and service pipes without disturbing other parts of the spittoon, the spittoon-bowl supported at the top of the discharge-pipe, and the water-sprayer connected to the supply-pipe, substantially as set forth.

4. The combination, in a fountain-spittoon, of the spittoon-bowl, the cock, the supporting-tube therefor, the sprayer connected with the cock, and the drip-pan connected with the supporting-tube between the cock and water-sprayer, and extending over the edge of the spittoon-bowl, substantially as and for the purpose set forth.

In testimony whereof I affix my signature in presence of two witnesses.

ARTHUR W. BROWNE.

Witnesses:
SEYMOUR CASE,
M. A. COLE.